(12) United States Patent
Eriksen et al.

(10) Patent No.: US 8,286,508 B2
(45) Date of Patent: Oct. 16, 2012

(54) SYSTEMS AND METHODS FOR MEASURING ANGULAR MOTION

(75) Inventors: Odd Harald Steen Eriksen, Minneapolis, MN (US); Shuwen Guo, Burnsville, MN (US); Yosief Abraha, Edina, MN (US)

(73) Assignee: Goodrich Corporation, Charlotte, NC (US)

( * ) Notice: Subject to any disclaimer, the term of this patent is extended or adjusted under 35 U.S.C. 154(b) by 251 days.

(21) Appl. No.: 12/839,216

(22) Filed: Jul. 19, 2010

(65) Prior Publication Data

US 2012/0012700 A1     Jan. 19, 2012

(51) Int. Cl.
*G01L 3/02* (2006.01)
(52) U.S. Cl. .................. 73/862.333; 73/862.08
(58) Field of Classification Search ...... 73/862.331–862.333, 862.08
See application file for complete search history.

(56) References Cited

U.S. PATENT DOCUMENTS

| | | | |
|---|---|---|---|
| 2,968,031 A | 1/1961 | Higa | |
| 3,783,496 A | 1/1974 | Siler | |
| 4,269,070 A | 5/1981 | Nelson et al. | |
| 4,312,042 A | 1/1982 | Bateman | |
| 4,480,480 A | 11/1984 | Scott et al. | |
| 4,651,402 A | 3/1987 | Bonfils | |
| 4,850,552 A | 7/1989 | Darden et al. | |
| 4,925,249 A * | 5/1990 | Auspelmyer | 301/111.01 |
| 5,010,775 A | 4/1991 | Choisnet | |
| 5,205,514 A | 4/1993 | Patzig et al. | |
| 5,314,115 A | 5/1994 | Moucessian | |
| 5,358,637 A | 10/1994 | Hutzler et al. | |
| 5,446,666 A | 8/1995 | Bauer | |
| 5,477,740 A * | 12/1995 | Shioya et al. | 73/862.191 |
| 5,518,206 A | 5/1996 | Arnold et al. | |
| 5,815,091 A * | 9/1998 | Dames et al. | 340/870.34 |
| 6,289,289 B1 | 9/2001 | Zweifel | |
| 6,334,588 B1 | 1/2002 | Porte | |
| 6,349,901 B1 * | 2/2002 | Grossman | 244/102 R |

(Continued)

FOREIGN PATENT DOCUMENTS

DE    3239877 A1    5/1984

(Continued)

OTHER PUBLICATIONS

Extended Search Report issued Feb. 8, 2012 in connection with EP Application No. 11250852.8.

(Continued)

*Primary Examiner* — Max Noori
(74) *Attorney, Agent, or Firm* — Edwards Wildman Palmer LLP; Scott D. Wofsy

(57) ABSTRACT

A system for monitoring landing gear position. An example rotation position sensor includes a hub mount that locks within a shaft of a joint, a first sensor attached to the hub mount, and a second sensor attached to the rotatably attached part that does not rotate. The hub mount includes a nut that has a partially tapered surface and a threaded cavity. The nut is secured within the shaft. The hub mount also includes a mounting unit that has a partially tapered surface that is in opposition to the partially tapered surface of the nut. A fastener secures the hub mount to the nut. In one example, the first sensor includes a magnetometer and the second sensor includes magnet(s). In another example, the first sensor includes inductor sensor(s) and the second sensor includes device(s) that causes a change in an inductance value of the inductor sensor(s) as the joint rotates.

18 Claims, 7 Drawing Sheets

U.S. PATENT DOCUMENTS

| | | |
|---|---|---|
| 6,354,152 B1 | 3/2002 | Herlik |
| 6,676,075 B2 | 1/2004 | Cowan et al. |
| 6,745,153 B2 | 6/2004 | White et al. |
| 6,880,784 B1 | 4/2005 | Wilkinson et al. |
| 6,902,136 B2 | 6/2005 | Mackness |
| 6,951,145 B2 * | 10/2005 | Kilmartin ............... 73/862.333 |
| 6,959,497 B2 * | 11/2005 | Leidinger ..................... 33/1 PT |
| 7,208,945 B2 | 4/2007 | Jones et al. |
| 7,589,645 B2 | 9/2009 | Schmidt |
| 7,680,630 B2 | 3/2010 | Schmidt |
| 7,843,363 B2 | 11/2010 | Grichener et al. |
| 2002/0199131 A1 | 12/2002 | Kocin |
| 2003/0209063 A1 | 11/2003 | Adamson et al. |
| 2004/0011596 A1 | 1/2004 | Miller et al. |
| 2004/0012212 A1 | 1/2004 | Pratt et al. |
| 2004/0075022 A1 | 4/2004 | MacKness |
| 2004/0102918 A1 | 5/2004 | Stana |
| 2004/0129834 A1 | 7/2004 | Luce |
| 2004/0225474 A1 | 11/2004 | Goldfine et al. |
| 2005/0030010 A1 | 2/2005 | Jones et al. |
| 2006/0004499 A1 | 1/2006 | Trego et al. |
| 2006/0038410 A1 | 2/2006 | Pratt et al. |
| 2007/0006662 A1 | 1/2007 | Giazotto |
| 2009/0173823 A1 | 7/2009 | Shetzer |
| 2012/0011946 A1 | 1/2012 | Eriksen et al. |
| 2012/0012700 A1 | 1/2012 | Eriksen et al. |
| 2012/0012701 A1 | 1/2012 | Eriksen et al. |
| 2012/0053784 A1 | 3/2012 | Schmidt et al. |

FOREIGN PATENT DOCUMENTS

| | | |
|---|---|---|
| DE | 4035197 A1 | 1/1992 |
| EP | 0072634 A1 | 2/1983 |
| EP | 1839984 A1 | 10/2007 |
| GB | 2226416 A | 6/1990 |
| SU | 1469339 A1 | 3/1989 |
| WO | WO-0212043 A | 2/2002 |
| WO | WO-2004013785 A2 | 2/2004 |
| WO | WO-2006067442 A1 | 6/2006 |

OTHER PUBLICATIONS

Extended Search Report issued Feb. 4, 2010 in connection with European Patent Application No. 05808070.6.

Office Action issued Feb. 3, 2012 in connection with U.S. Appl. No. 13/271,468.

Partial Search Report issued Nov. 2, 2011 in connection with European Patent Application No. 11250645.6.

Office Action issued Mar. 19, 2012 in connection with U.S. Appl. No. 12/839,401.

Extended Search Report issued Mar. 15, 2012 in connection with European Patent Application No. 11250645.6.

Partial Search Report issued Nov. 2, 2011 in connection with European Patent Application No. 11250647.2.

Extended Search Report issued Mar. 15, 2012 in connection with European Patent Application No. 11250647.2.

* cited by examiner

SYSTEMS AND METHODS FOR MEASURING ANGULAR MOTION

BACKGROUND OF THE INVENTION

There are presently some devices for monitoring loading of landing gear. Current systems have a low level of accuracy and provide little information on actual stresses in the landing gear structure. A new landing gear overload system is devised. One element of such a system is measurement of strut extension, allowing calculation of loading moment on the strut. Conventional means of measuring strut extension might rely on position sensors which are delicate, expensive, and require significant protection from debris and other environmental factors.

SUMMARY OF THE INVENTION

The present invention provides a system for monitoring landing gear position. The present invention also provides a system for measuring strut extension by measuring rotation of the torque linkage which occurs as the strut is extended.

An example rotation position sensor includes a hub mount that locks within a shaft of a joint between two rotatably attached parts, a first sensor component that is attached to the hub mount, and a second sensor component that is attached to the rotatably attached part that does not rotate with the joint of the shaft. The hub mount includes a nut that has a partially tapered surface and a threaded cavity. The nut is secured within the shaft. The hub mount also includes a mounting unit that has a partially tapered surface that is in opposition to the partially tapered surface of the nut. A fastener is received within the threaded cavity for securing the hub mount to the nut.

In one aspect of the invention, the partially tapered surface of the nut is an outer surface and the partially tapered surface of the mounting unit is in inner surface.

In another aspect of the invention, the first sensor component includes a magnetometer and the second sensor component includes one or more magnets.

In still another aspect of the invention, the first sensor component includes one or more inductor sensors and the second sensor component includes one or more devices that cause a change in an inductance value of the one or more inductor sensors as the joint rotates.

These and other examples of the invention will be described in further detail below.

BRIEF DESCRIPTION OF THE DRAWINGS

Preferred and alternative examples of the present invention are described in detail below with reference to the following drawings:

FIGS. 5-1, 5-2 illustrate magnetometer used in the device shown in FIG. 4;

DETAILED DESCRIPTION OF THE PREFERRED EMBODIMENT

Figure 1:
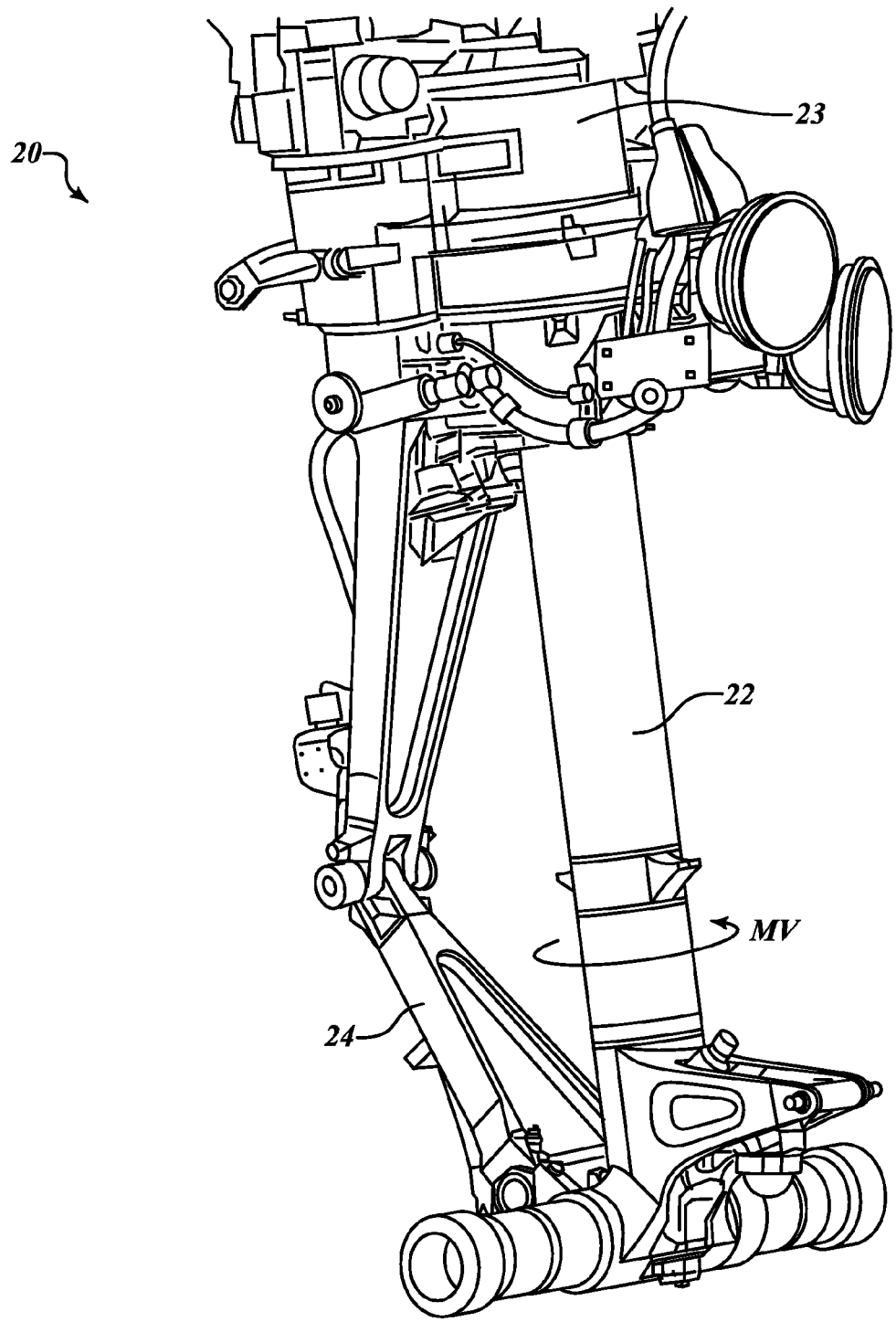
FIG. 1 is a perspective view of a landing gear assembly.
Figure 2:
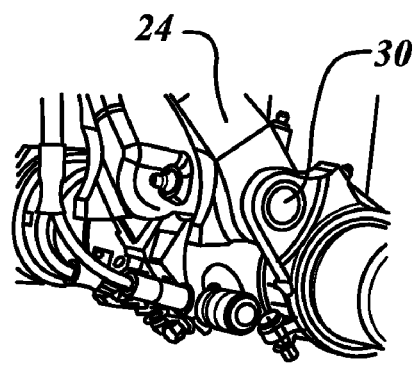
FIG. 2 is a perspective view of a link joint of the assembly shown in FIG. 1.

FIGS. 1 and 2 illustrate a landing gear structure 20 having a torque linkage 24. The torque linkage 24 restrains a piston 22 from rotating within a strut 23 under a torque MV. The torque linkage 24 is designed to flex as the piston 22 is telescoped into the strut 23. The present invention is a device that mounts within a link joint shaft 30 for sensing rotation of the link joint shaft 30 to determine position of the piston 22 relative to the strut 23 (i.e., amount of piston extension).

Figure 3:
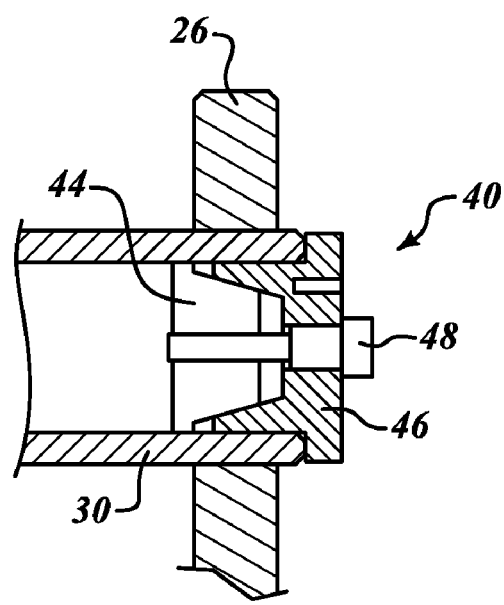
FIG. 3 is a cross-sectional view of a joint mounting component formed in accordance with the present invention.

FIG. 3 shows a hub assembly 40 mounted in the joint shaft 30. Other joints in the landing gear structure 20 may be used. The hub assembly 40 includes a shaft nut 44, a bolt 48 and a tapered locking hub 46 which has independent axial fingers formed by slitting the hub radially every 20 degrees or more or less often. The shaft nut 44, the bolt 48 and the tapered locking hub 46 are loosely assembled with the bolt 48 inserted through the locking hub 46 and a threaded cavity of the nut 44. This loose assembly is inserted into the shaft 30. As the bolt 48 is tightened into the nut 44, the tapered locking hub 46 securely wedges between the outer circumference of the nut 44 and the inner wall of the shaft 30. An outer flange of the tapered locking hub 46 may come in contact with an outer edge of the shaft 30. Other configurations between the nut 44 and the hub 46 may be used.

Figure 4:
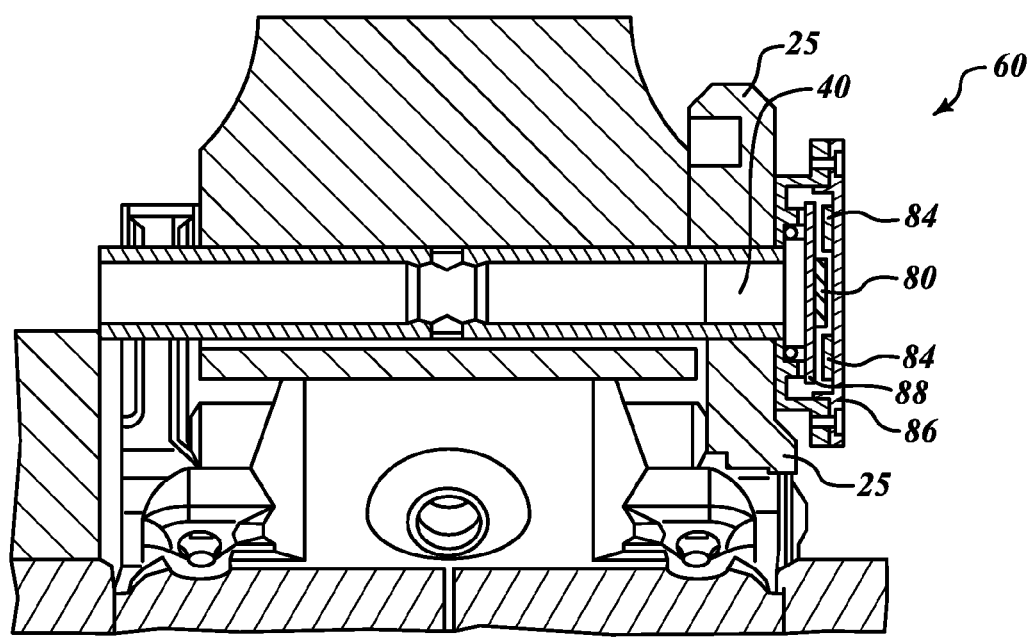
FIG. 4 is a cross-sectional view of a monitoring device formed in accordance with an embodiment of the present invention.
Figures 1, 5:
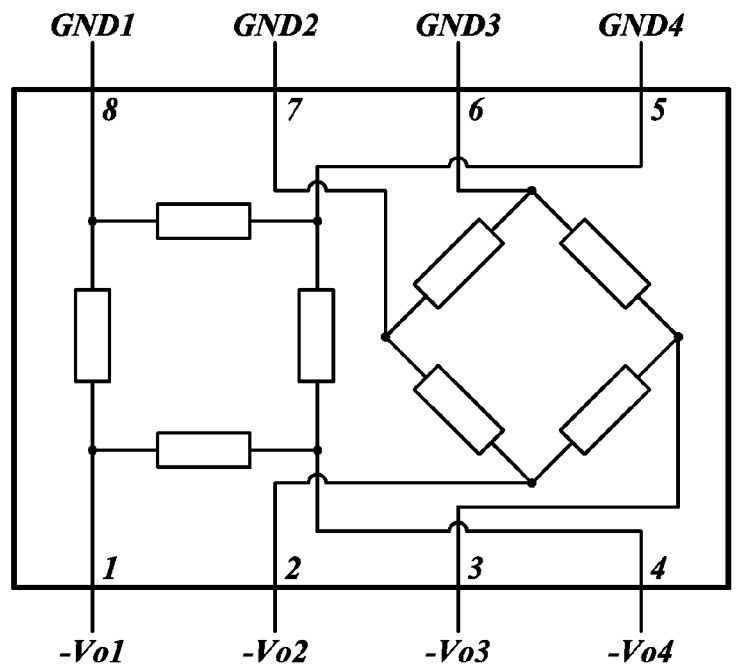
Figures 2, 5:
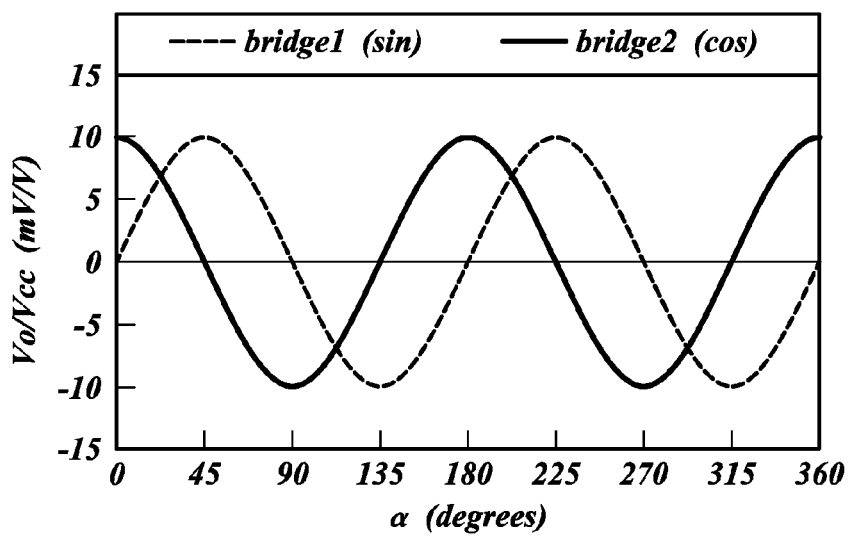

As shown in FIG. 4, a magnetometer angle sensor 60 is mounted to the link joint shaft 30 via the hub assembly 40. The sensor 60 includes thin magnets 82, 84, and a magnetoresistive magnetometer 80 attached to a circuit card 88. The circuit card 88 is attached (bolted, epoxy, or other attachment device) to the hub assembly 40. The magnetometer 80 is positioned on the circuit card 88 such that it fits between the two magnets 82, 84 that are attached to the stationary strut 25 via a frame device 86. The magnets 82, 84, are opposed to each other, presenting opposite north/south poles to the magnetometer 80. The magnetometer 80 has magnetoresistive elements in a Wheatstone bridge configuration. There are two bridges in the device which are 45° apart relative to each other. As the device rotates in the field, the bridge output varies as the resistance of each of the bridge elements is dependent on the direction of the flux field relative to element. Rotation of the magnetometer 80 via the hub 40 within this intervening flux field caused by the magnets 82, 84 varies the total resistivity of each bridge of the magnetometer 80 such that the voltage output from each bridge varies with angle but differently due to their 45° difference in orientation. The actual angle is solved mathematically (Equation 1) from the two voltages as shown below. FIGS. 5-1, 5-2 indicate a schematic representation of the sensor and the variables used in Equation 1:

$$\frac{V_{a,sin}}{V_{a,cos}} = \frac{\frac{V_0}{2} \cdot \frac{\Delta R}{R} \cdot \sin(2 \cdot \alpha)}{\frac{V_0}{2} \cdot \frac{\Delta R}{R} \cdot \cos(2 \cdot \alpha)} = \frac{\sin(2 \cdot \alpha)}{\cos(2 \cdot \alpha)} = \tan(2 \cdot \alpha) \text{ and} \quad (1)$$

$$Y = \frac{V_{a,sin}}{V_{a,cos}}. \Rightarrow \alpha = \frac{1}{2}\arctan(Y)$$

Where α=the angle relative to the magnetic flux lines
R=resistance in ohms of the respective bridges Y=the ratio of the two bridge voltages The ARCTAN of Y yields the angle α.

Figure 6:
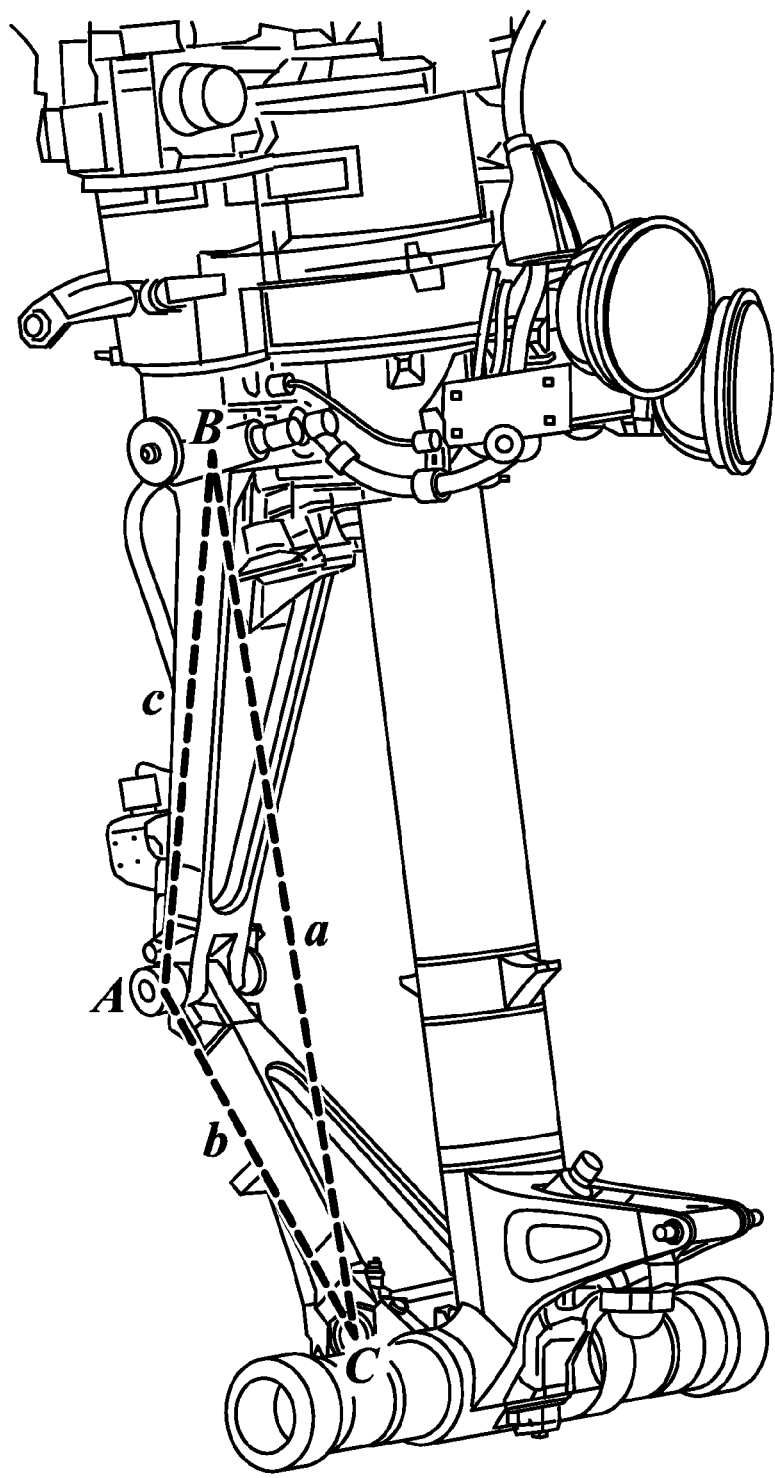
FIG. 6 illustrate a geometrical relationship of the strut assembly.

The sensor 60 measures the angular position of the torque link 24. The calculations below (Equation 2) are used to determine the relative motion of the piston. FIG. 6 is a schematic representation of the sensor and the variables used in Equation 2: (not to be confused with the variable in equation 1)

$$a = b \cos C + \sqrt{c^2 - b^2 \sin^2 C} \quad (2)$$

C=sensed angle a=distance of strut extension

An example magnetometer device is produced by MEAS Deutschland GmbH, which incorporates two magnetoresistive bridges at 45 degrees to each other as described above. This device is mounted on the circuit card 88 and position in the center of the flux field between magnets 84.

In one embodiment, support electronics are applied to the circuit board hosting the magnetometer 80. The support electronics may include a battery and/or a local wireless transmitter that is either integral to the magnetometer 80 or wired to a separate host module elsewhere in the system.

Figure 7:
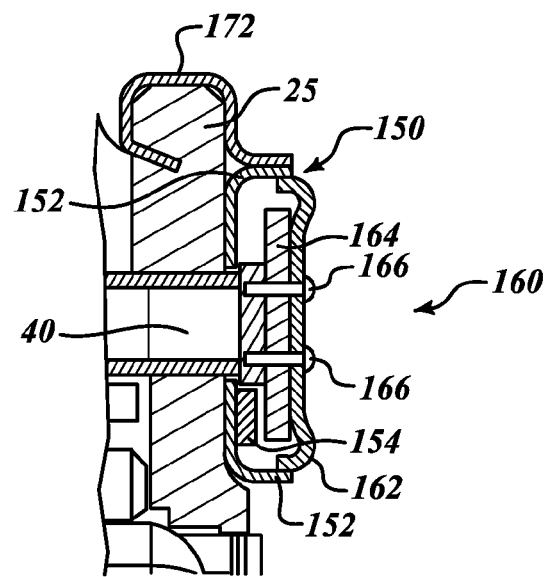
FIGS. 7-10 are cross-sectional views of various monitoring device formed in accordance with an alternate embodiments of the present invention.

As shown in FIG. 7, a sensor 160 extends beyond the end of the shaft 30. The sensor 160 includes a sensing element 164 that is mounted on the hub assembly 40. A two-part metal shield 150 protects the sensor 160 from contamination. The shield 150 includes a first half 152 that attaches to a fixed portion of the strut 25. The shield 150 includes a second half 162 that attaches to the hub assembly 40 using lugs or screws or other fastening means 166. The second half 162 and the shaft 30 move with the torque linkage 24 as it rotates. In one embodiment, a securing device 172 is bonded or integral with the first half 152. The securing device 172 is secured in various ways to the strut 25 depending on the strut configuration. The halves 152, 162 come in contact to provide a seal.

In one embodiment, a puck 154 is mounted to the first half of the shield 152. The sensing element 164 includes one or more antennae (an example is produced by Sagentia Ltd., UK), which are mounted to the hub assembly 40. The one or more antennae face the puck 154. Rotational position is sensed by mutual inductance between the puck 154 and the antennae. The antennae include a receive circuit and a set of current-carrying conductors (i.e., a transmit circuit) that produce an alternating electromagnetic field. The receive circuit is electrically insulated from the transmit circuit. Signals induced in the receive circuits may be electronically decoded using various methods in order to provide information about the position of the torque link/shaft.

The puck 154 includes a passive resonant circuit having a resonant frequency in the range of 1-3 MHz—other frequencies may be used. The puck 154 includes a capacitor mounted on a printed circuit board whose conductors are patterned in such a way as to produce an inductor. A sending antenna patterned on a circuit board forms a portion of a sensing element 164 that radiates an RF field inducing a current in the puck 154. The puck 154 re-radiates a field activating a receive antenna located on the sensing element 164 from which is derived the position of the puck from which is inferred the rotational angle of the torque link/shaft. Details of this mechanism can be found in U.S. Pat. No. 7,208,945 owned by Sagentia Ltd.

In another embodiment, the locations of the puck 154 and the antenna board 164 may be reversed.

Figure 8:
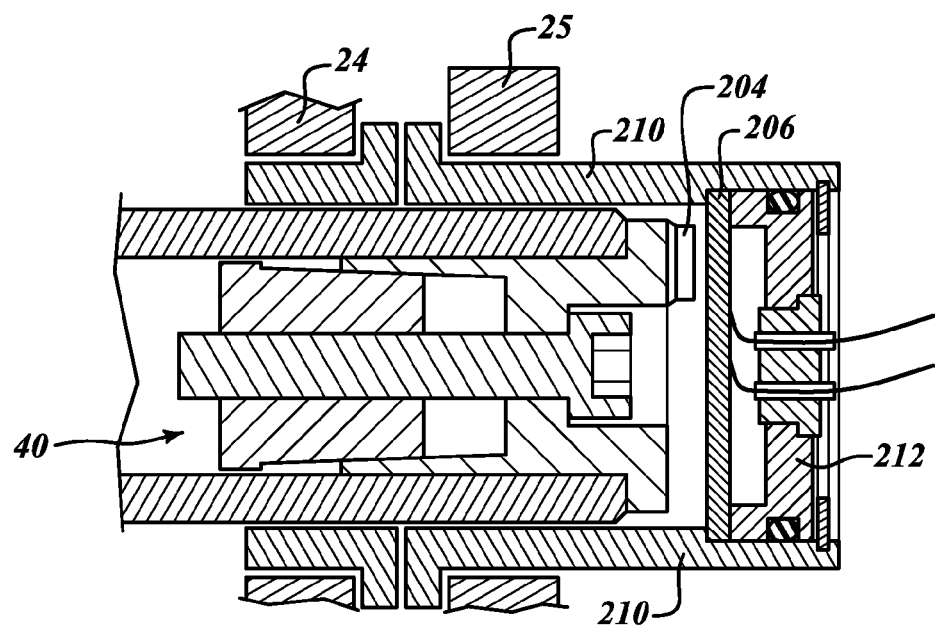

In another embodiment, the inductive sensor is enclosed within the bushing or shaft of the landing gear in the interest of reducing size and offering protection from flying debris. In FIG. 8, a bushing 210 mounts to the stationary strut (lug) 25 and extends beyond the hub assembly 40. The hub assembly 40 receives the inductive puck 204. The antenna board 206 is mounted to the bushing 210 or to a retainer 212 which hermetically seals the puck(s) 204 and the antenna board 206.

Figure 9:
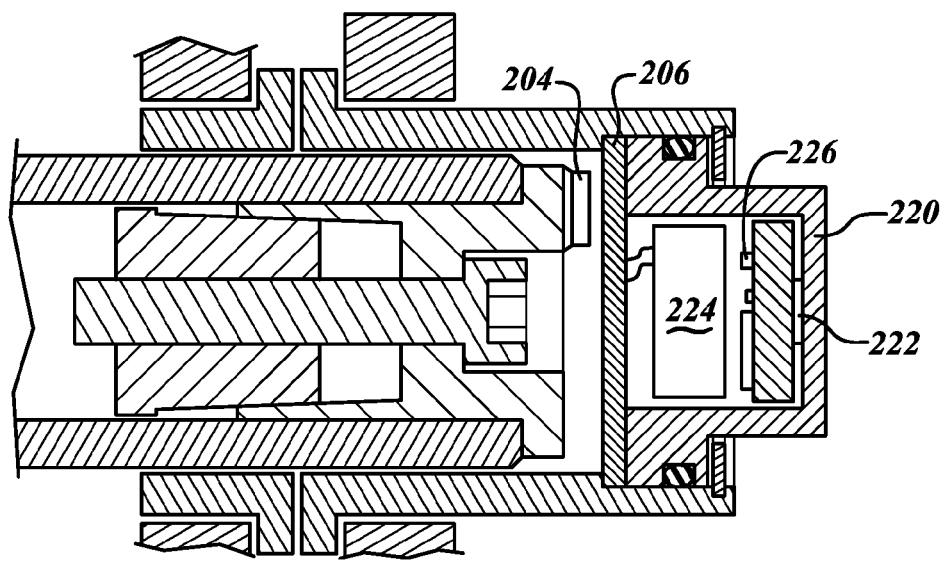

In another embodiment, as shown in FIG. 9, the sensor of FIG. 8 includes a radome 220 that is attached to or part of the stationary bushing 210. A battery 224 and a radio circuit 226 are located within the radome 220. The radio circuit 226 is in signal communication with the antenna board 206 and an antenna 222. The radome 220 is made of a low dielectric material as to not interfere with radio propagation. Various methods of sealing may be employed.

Figure 10:
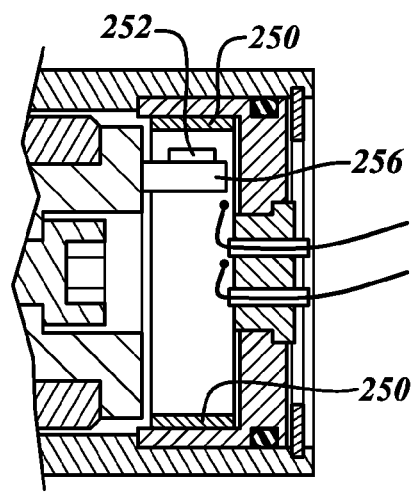

FIG. 10 illustrates an embodiment where a flexible antenna 250 that is attached to an inner wall of a portion attached to the strut 25 or a retainer. A puck 252 is mounted to a component 256 such that the puck 252 faces the flexible antenna 250 and is attached to the hub assembly 40.

While the preferred embodiment of the invention has been illustrated and described, as noted above, many changes can be made without departing from the spirit and scope of the invention. For example, many other types of encoders may be suitable, such as capacitive, eddy current, optical, etc. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A rotation position sensor, comprising:
   a hub mount configured to lock within a shaft of a joint between two rotatably attached parts, the hub mount including locking features configured to fix the hub mount to the shaft to prevent relative rotation of the hub mount and the shaft;
   a first sensor component fixed to the hub mount to prevent relative rotation of the hub mount and the first sensor component; and
   a second sensor component operatively connected to the first sensor component for rotation relative thereto for sensing rotation between the first and second sensor components, thereby allowing for sensing the relative rotation of said two rotatably attached parts.

2. The sensor of claim 1, wherein the locking features include a nut having a partially tapered surface and a threaded cavity, wherein the nut is secured within the shaft, a mounting unit having a partially tapered surface that is in opposition to the partially tapered surface of the nut, and a fastener configured to be received within the threaded cavity for securing the mounting unit to the nut, whereby the hub mount is secured to the shaft.

3. The sensor of claim 1, wherein the partially tapered surface of the nut is an outer surface and the partially tapered surface of the mounting unit is an inner surface.

4. The sensor of claim 1, wherein the first sensor component comprises a magnetometer and the second sensor component comprises at least one magnet.

5. The sensor of claim 1, wherein the first sensor component includes at least one inductor sensor and the second sensor component comprises a first component configured to induce a current in at least one inductor sensor and a second component configured to receive a signal from at least one inductor sensor.

6. The sensor of claim 5, wherein the second sensor component comprises a flexible circuit mounted to an interior wall of a housing surrounding the hub mount.

7. The sensor of claim 5, wherein the second sensor component includes at least one inductor sensor and the first sensor component comprises a first component configured to induce a current in at least one inductor sensor and a second component configured to receive a signal from at least one one inductor sensor.

8. The sensor of claim 5, further comprising a transmitter configured to transmit a signal produced by one of the first and second sensor components.

9. The sensor of claim 2, further comprising a cover that protects the sensors from contaminants.

10. A landing gear assembly, comprising:
   a strut assembly;
   a torque linkage assembly;
   a joint having a shaft connecting the strut assembly to the torque linkage assembly; and
   a rotation position sensor having a hub mount configured to lock within the shaft of the joint, the hub mount including locking features configured to fix the hub mount to the shaft to prevent relative rotation of the hub mount and the shaft, a first sensor component fixed to the hub mount to prevent relative rotation of the hub mount and the first sensor component, and a second sensor component operatively connected to the first sensor component for rotation relative thereto for sensing rotation between the first and second sensor components, thereby allowing for sensing the relative rotation of said strut assembly and said torque linkage assembly.

11. The landing gear assembly of claim 10, wherein the locking features include a nut having a partially tapered surface and a threaded cavity, wherein the nut is secured within the shaft, a mounting unit having a partially tapered surface that is in opposition to the partially tapered surface of the nut, and a fastener configured to be received within the threaded cavity for securing the mounting unit to the nut.

12. The landing gear assembly of claim 11, wherein the partially tapered surface of the nut is an outer surface and the partially tapered surface of the mounting unit is an inner surface.

13. The landing gear assembly of claim 10, wherein the first sensor component includes a magnetometer and the second sensor component includes at least one magnet.

14. The landing gear assembly of claim 10, wherein the first sensor component includes at least one inductor sensor and the second sensor component includes a first component configured to induce a current in at least one inductor sensor and a second component configured to receive a signal from at least one inductor sensor.

15. The landing gear assembly of claim 14, further comprising a housing component attached to the strut assembly, the housing component surrounding the hub mount, wherein the second sensor component comprises a flexible circuit mounted to an interior wall of the housing component.

16. The landing gear assembly of claim 14, wherein the second sensor component includes at least one inductor sensor and the first sensor component includes a first component configured to induce a current in at least one inductor sensor and a second component configured to receive a signal from at least one inductor sensor.

17. The landing gear assembly of claim 10, further comprising a transmitter configured to transmit a signal produced by one of the first and second sensor components.

18. The landing gear assembly of claim 11, further comprising a cover that protects the sensors from contaminants.

* * * * *